F. H. CLIFT.
AIR SPEED INDICATOR FOR USE ON AEROPLANES AND THE LIKE.
APPLICATION FILED SEPT. 21, 1917.
1,267,633.
Patented May 28, 1918.
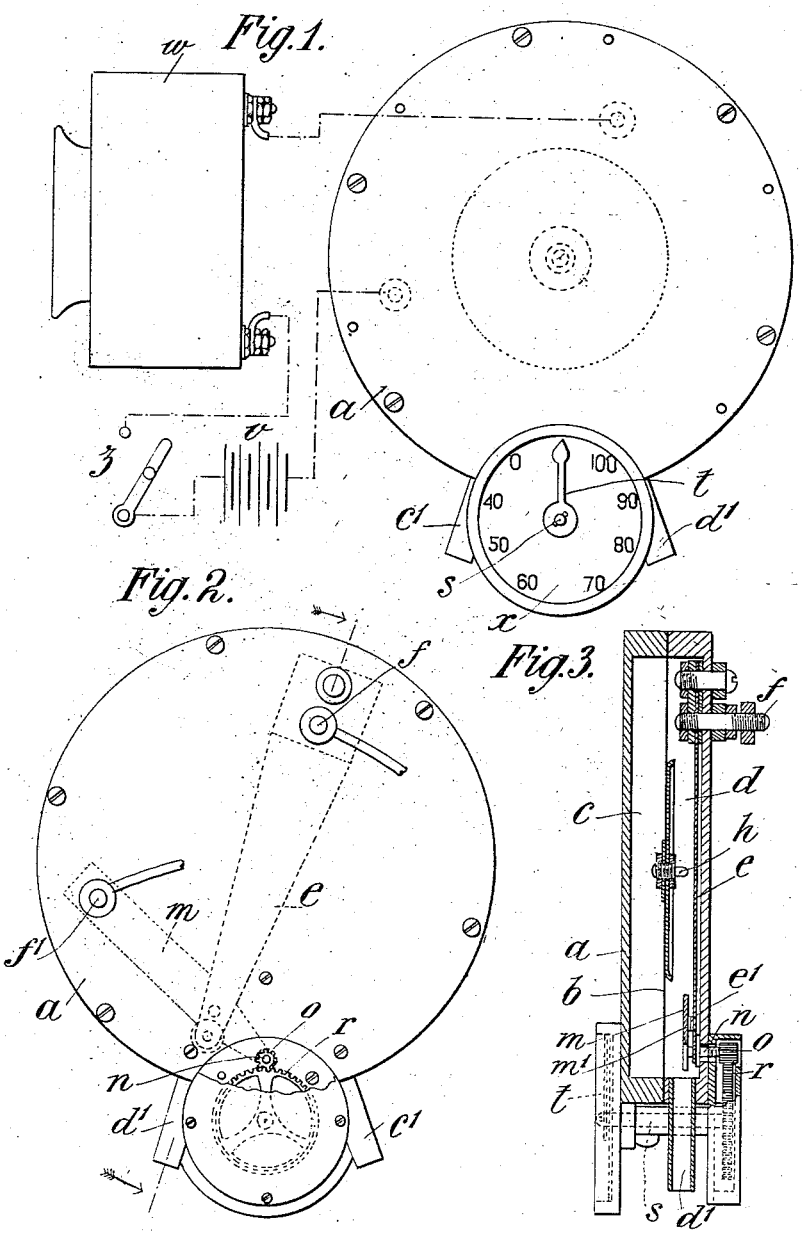
INVENTOR.
F. H. Clift.
Robert O. Phillips
Attorney.

UNITED STATES PATENT OFFICE.

FREDERIC HOLLOCOOMBE CLIFT, OF BARNES, LONDON, ENGLAND.

AIR SPEED-INDICATOR FOR USE ON AEROPLANES AND THE LIKE.

1,267,633.      Specification of Letters Patent.      Patented May 28, 1918.

Application filed September 21, 1917. Serial No. 192,513.

*To all whom it may concern:*

Be it known that I, FREDERIC HOLLOCOOMBE CLIFT, a subject of the King of Great Britain and Ireland, residing at 95 Castlenau, Barnes, in the county of London, England, have invented new and useful Improvements in and Relating to Air Speed-Indicators for Use on Aeroplanes and the like, of which the following is a specification.

This invention relates to indicators for denoting the speed at which aeroplanes and the like are traveling, and it consists of an instrument operated by a pressure and static pipe for producing an audible signal when the motion of the aircraft through the air reaches a certain defined and pre-arranged speed, the object being to convey to the pilot or other occupant of the machine that the speed of the craft has dropped to a dangerously low rate.

According to the present invention, the movement of a diaphragm or its equivalent operated by means of the usual pressure and suction or static pipes, as is employed in speed indicators of the type in which the mechanism is operated by the pressure of air due to the relative movement of the machine and the air, is employed to complete an electric circuit and produce by an electrical buzzer or other suitable sound-producing device an audible signal when the speed of the machine has dropped below a predetermined rate.

The pressure and suction or static pipes are preferably located in the slip stream of the propeller of the machine so that the audible signal will be produced at different speeds at which the machine is moving according to whether it is gliding, i. e., not being driven by the propeller, or is being propelled, but this is not obligatory provided that it will suffice if the audible signal is given at one speed only.

In the accompanying drawing which shows an instrument constructed according to this invention:—

Figure 1 is a diagrammatic view showing the several parts,

Fig. 2 is a view in plan from the underside of the contact maker, and

Fig. 3 is a view in section of said device.

Throughout the views similar parts are marked with like letters of reference.

In a case $a$ is mounted a flexible diaphragm $b$ so as to form two chambers, a pressure chamber $c$ and a suction or as it is more generally designated static chamber $d$, into which are led the pressure and suction or static pipes $c^1$ and $d^1$. On the bottom of and within the case $a$ is mounted a flat spring finger $e$ which is insulated from the case in any suitable manner and has an exterior terminal $f$. The diaphragm $b$ carries a pin $h$ or the like which on deflection by reason of the pressure in the chamber $c$ contacts the spring finger $e$ and imparts an outward movement to it. Mounted on the bottom of and within the case $a$ is another flat spring finger $m$ which is arranged transversely to and above the spring finger $d$. This spring is also insulated from the case $a$ in any suitable manner and has an exterior terminal $f^1$. These two fingers $e$ and $m$ each carries a platinum or other suitable contact point $e^1$ and $m^1$. These points are normally in contact so that the electric circuit through the terminals $f$ and $f^1$ is closed and the buzzer $w$, which is in said circuit together with the battery $v$, sounds, but when the machine is flying and attains the predetermined speed the contact points $e^1$ and $m^1$ are separated by the movement of the diaphragm $b$ acting under the influence of the pressure of air on the diaphragm to thrust the pin $h$ against the spring $e$. When, however, the speed of the machine drops below the predetermined rate the contact point $e^1$ carried by the finger $e$ is allowed to come into contact again with the contact point $m^1$ carried by the spring $m$ by reason of the movement of the diaphragm $b$ due to the reduced air pressure on it which thus completes the electric circuit through the terminals $f$ and $f^1$ and sounds the buzzer. The electric buzzer is preferably independent of the instrument and is fixed in suitable juxtaposition to the pilot.

To adjust the position of the contact point $m^1$ carried by the finger $m$ in relation to the contact point $e^1$ carried by the finger $e$ in order to vary the normal position of the contact points $e^1$ and $m^1$ and thus regulate the pressure on the diaphragm, and consequently the speed of the machine at which the audible signal is provided a screw $n$ is threaded into the case $a$ so that one end of it contacts the under side and provides a means for varying the normal distance between the contact points $e^1$ and $m^1$. On the screw $n$ is mounted a pinion $o$ which gears with a spur wheel $r$ mounted on a spindle $s$ carried in suitable bearings on the case $a$. By rotating this spindle by means of a suitable key or the like the necessary motion can be imparted to the screw $n$ to adjust the relative positions of the contact points $e^1$ and $m^1$.

To indicate at what speed—in miles per hour—the instrument is set to produce the audible signal, a hand or index $t$ is mounted on the spindle $s$ to rotate over a marked dial $x$.

It will be appreciated that this device can be combined with any speed indicator of the visual reading type which is operated by means of a pressure and a static pipe and in which the pressure of air only, due to the relative movement of the machine and the air, is employed, in which case a single diaphragm may be employed to operate both the visual reading and the audible indicators. In order that the audible signal shall not be given when the aircraft is commencing or ending a flight when its speed is naturally low a switch $z$ may be introduced into the electric circuit.

What I claim as my invention and desire to secure by Letters Patent is:—

1. An audible speed indicator for aeroplanes and the like, comprising a case divided by means of a flexible diaphragm into two chambers, one a pressure chamber and the other a so-called static chamber, a pressure pipe leading into the pressure chamber, a suction pipe leading into the static chamber, a flat spring finger mounted in the static chamber and insulated from the case, a contact point carried by said spring finger, a terminal connected to said finger, a second spring finger similarly mounted in said case, a contact point carried by said spring finger and adapted to engage the contact point carried by the other spring finger, a terminal connected to said second spring finger, a pin carried by the diaphragm and adapted to contact the first spring finger, means for adjusting the position of one of the contact points carried by one of the spring fingers relative to that carried by the other spring finger, an electric buzzer or the like, a battery or other source of electric energy and an electric lead connecting said contact maker, buzzer and battery.

2. An audible speed indicator for aeroplanes and the like, comprising a case divided by means of a flexible diaphragm into two chambers, one a pressure chamber and the other a so-called static chamber, a pressure pipe leading into the pressure chamber, a suction pipe leading into the static chamber, a flat spring finger mounted in the static chamber and insulated from the case, a terminal connected to said spring finger, a second spring finger similarly mounted and having a similar terminal, a pin or projection carried by the diaphragm and adapted to contact the first spring finger, electric contact points carried by the two spring fingers and opposed to one another, means for adjusting the position of one of these contact points relative to the other, an electric buzzer or the like and a battery or other source of electric energy both of which are coupled up in circuit with the instrument through the terminals connected to the spring fingers, and means for adjusting the speed at which the instrument will produce the audible signal.

3. An audible speed indicator for aeroplanes and the like, comprising a case divided by means of a flexible diaphragm into two chambers, one a pressure chamber and the other a so-called static chamber, a pressure pipe leading into the pressure chamber, a suction pipe leading into the static chamber, a flat spring finger mounted in the static chamber and insulated from the case, a terminal connected to said spring finger, a second spring finger similarly mounted and having a similar terminal, a pin or projection carried by the diaphragm and adapted to contact the first spring finger, electric contact points carried by the two spring fingers and opposed to one another, means for adjusting the position of one of these contact points relative to the other, an electric buzzer or the like and a battery or other source of electric energy both of which are coupled up in circuit with the instrument through the terminals connected to the spring fingers, and means for indicating at what speed the instrument will produce the audible signal.

4. An audible speed indicator for aeroplanes and the like, comprising a case divided by means of a flexible diaphragm into two chambers one a pressure chamber and the other a so-called static chamber, a pressure pipe leading from a position in the slip stream of the propeller of the aeroplane to the pressure chamber, a suction pipe leading from a position in the slip stream of the propeller of the aeroplane to the static chamber, a flat spring finger mounted in the static chamber and insulated from the case, a terminal connected to said spring finger, a second spring finger similarly mounted and having a similar terminal, a boss or projection carried by the diaphragm and adapted to contact the first spring finger, electric contact points carried by the two spring fingers and opposed to one another, means for adjusting the position of one of these contact points relative to the other and an electric buzzer or the like and a battery or other source of electric energy both of which are coupled up in circuit to the spring fingers.

5. An audible speed indicator for aeroplanes and the like, comprising a case divided by means of a flexible diaphragm into two chambers one a pressure chamber and the other a so-called static chamber, a pressure pipe leading from a position in the slip stream of the propeller of the aeroplane to the pressure chamber, a suction pipe leading from a position in the slip stream of the propeller of the aeroplane to the static chamber, a flat spring finger mounted in the static chamber and insulated from the case, a terminal connected to said spring finger, a second spring finger similarly mounted and having a similar terminal, a boss or projection carried by the diaphragm and adapted to contact the first spring finger, electric contact points carried by the two spring fingers and opposed to one another, means for adjusting the position of one of these contact points relative to the other, means for adjusting the speed at which the instrument will produce the audible signal, means for indicating at what speed the instrument is set to produce the audible signal, and an electric buzzer or the like, a switch and a battery or other source of electric energy said contact maker buzzer switch and battery being coupled up in one circuit.

6. The combination with a visual reading speed indicator of the type specified of a speed indicator of the audible type, comprising a case such as $a$ divided by a diaphragm $b$ into a chamber $c$ and a chamber $d$, a pipe $c^1$ leading into the chamber $c$, a pipe $d^1$ leading into the chamber $d$, a spring finger $e$ insulatedly mounted in the chamber $d$, an electric contact point $e^1$ carried by said finger, an exterior terminal $f$ in connection with said finger, means of contact between the diaphragm $b$ and the finger $e$, a spring finger $m$ insulatedly mounted within the chamber $d$, an electric contact point $m^1$ carried by said finger, an exterior terminal $f^1$ in connection with said finger $m$, a screw $n$ for adjusting the position of the contact point $m^1$ carried by the finger $e$, and an electric buzzer $w$ or the like placed in circuit with the contact points $e^1$ and $m^1$ through the terminals $f$ and $f^1$ and an electric battery $v$.

7. The combination with a visual reading speed indicator of the type specified, the combination of a speed indicator of the audible type which comprises a case such as $a$ divided by a diaphragm $b$ into a chamber $c$ and a chamber $d$, a pipe $c^1$ leading into the chamber $c$, a pipe $d^1$ leading into the chamber $d$, a spring finger $e$ insulatedly mounted in the chamber $d$, an electric contact point $e^1$ carried by said finger, means of contact between the diaphragm $b$ and the finger $e$, a spring finger $m$ insulatedly mounted within the chamber $d$, an electric contact point $m^1$ carried by said finger, an exterior terminal $f^1$ in connection with said finger $m$, a screw $n$ for adjusting the position of the contact point $m^1$ carried by the finger $m$ in relation to the contact point $e^1$ carried by the finger $e$, a spindle $s$, mounted in suitable bearings adjacent to the screw $n$, gearing between the spindle $s$, and the screw $n$, a dial $x$ over which said hand or index moves, means for rotating the spindle $s$, and a battery $v$ a switch $z$ and an electric buzzer $w$ or the like all placed in circuit with the contact points $e^1$ and $m^1$ of the contact maker.

8. In a speed indicator of the audible type for aeroplanes and the like, the combination of a case such as $a$ divided by a diaphragm $b$ into a chamber $c$ and a chamber $d$, a pipe $c^1$ leading from a position in the slip stream of the propeller of the aeroplane into the chamber $c$, a pipe $d^1$ leading from a position in the slip stream of the propeller of the aeroplane into the chamber $d$, a spring finger $e$ insulatedly mounted in the chamber $d$, an electric contact point $e^1$ carried by said finger, an exterior terminal $f$ in connection with said finger, means of contact between the diaphragm $b$ and the finger $e$, a spring finger $m$ insulatedly mounted within the chamber $d$, an electric contact point $m^1$ carried by said finger, an exterior terminal $f^1$ in connection with said finger $m$, a battery $v$, and an electric buzzer $w$, said contact maker, buzzer and battery being connected up in one circuit.

9. In a speed indicator of the audible type for aeroplanes and the like, the combination of a case such as $a$ divided by a diaphragm $b$ into a chamber $c$ and a chamber $d$, a pipe $c^1$ leading from a position in the slip stream of the propeller of the aeroplane into the chamber $c$, a pipe $d^1$ leading from a position in the slip stream of the propeller of the aeroplane into the chamber $d$, a spring finger $e$ insulatedly mounted in a chamber $d$, an electric contact point $e^1$ carried by said finger, an exterior terminal $f$ in connection with said finger, means of contact between the diaphragm $b$ and the finger $e$, a spring finger $m$ insulatedly mounted within the chamber $d$, an electric contact point $m^1$ carried by said finger, an exterior terminal $f^1$ in connection with said finger $m$, a screw $n$ for adjusting the position of the contact point $m^1$ carried by the finger $e$, a battery $v$, a switch $z$ and an electric buzzer $w$, said contact maker, buzzer, battery and switch being connected up in one circuit.

10. In a speed indicator of the audible type for aeroplanes and the like, the combination of a case such as $a$ divided by a diaphragm $b$ into a chamber $c$ and a chamber $d$, a pipe $c^1$ leading from a position in the slip stream of the propeller of the machine into the chamber $c$, a pipe $d^1$ leading from a position in the slip stream of the propeller of the machine into the chamber $d$, a spring finger $e$ insulatedly mounted in the chamber $d$, an exterior terminal $f$ in connection with said finger, means of contact between the diaphragm $b$ and the finger $e$, a spring finger $m$ insulatedly mounted within the chamber $d$, an electric contact point $m^1$ carried by said finger, an exterior terminal $f^1$ in connection with said finger $m$, a screw $n$ for adjusting the position of the contact point $m^1$ carried by the finger $m$, a spindle $s$ mounted in suitable bearings adjacent to the screw $n$, gearing between the spindle $s$ and the screw $n$, a hand or index finger $t$ carried by the spindle $s$, a dial $x$ over which said hand or index moves, means for rotating the spindle $s$, a battery $v$, a switch $z$ and a buzzer $w$ and an electric lead connecting said contact maker, buzzer, switch and battery in one circuit.

In testimony whereof I have signed my name.

FREDERIC HOLLOCOOMBE CLIFT.

Witnesses:
HANEY J. BAVERSTOCK,
CHARLES PACK.